United States Patent [19]
Kaneko

[11] Patent Number: 5,617,004
[45] Date of Patent: Apr. 1, 1997

[54] BATTERY CHARGING APPARATUS FOR SERIES BATTERY

[75] Inventor: Akira Kaneko, Shirakawa, Japan

[73] Assignee: Integran, Inc., Tokyo, Japan

[21] Appl. No.: 502,085

[22] Filed: Jul. 14, 1995

[30] Foreign Application Priority Data

Jul. 18, 1994 [JP] Japan ................................. 6-187851

[51] Int. Cl.$^6$ ........................................... H01M 10/46
[52] U.S. Cl. ........................... 320/15; 320/35; 320/39
[58] Field of Search ............................. 320/6, 7, 15, 16, 320/17, 30, 35, 36, 39, 40, 48, 56

[56] References Cited

U.S. PATENT DOCUMENTS 3,555,395  1/1971  Beery ................................. 320/6 X
5,469,042  11/1995  Rühling .............................. 320/17

Primary Examiner—Edward H. Tso

[57] ABSTRACT

A plurality of battery charging modules C, equal in number to a plurality of batteries B connected in series, are connected in series form a column of battery charging modules 6. Output terminals 7, 8 of this column 6 serve as the connecting terminals for a beginning terminal 2 and an ending terminal 3 of the series-connected column of batteries 1. A connecting point between consecutive batteries B connects to a junction point between consecutive battery charging modules C. This configuration enables the column of battery charging modules 6 to be connected with the column of batteries 1 and results in a set of parallel connections between the battery charging modules C and the corresponding batteries B. This enables current to flow at the same time from the battery charging modules C to each battery B connected in series therewith to charge batteries, and after the battery B with the largest balance of residual capacity is charged fully, the battery with the second largest balance of residual capacity is charged by the corresponding charging module C, and thereafter batteries are charged in the order of importance of residual capacity balance.

8 Claims, 4 Drawing Sheets

BATTERY CHARGING APPARATUS FOR SERIES BATTERY

BACKGROUND OF THE INVENTION

1. Field of the Invention

This invention relates to a battery charging apparatus for series battery, which battery being mounted on electric cars and being used on robots, carriers as well as used for emergency power source.

2. Description of the Related Art

In recent years motor-driven electric cars are becoming increasingly popular for which clean and pollution-free batteries are used as a power source. Batteries mounted on such electric cars must satisfy the following requirements. Substances contained in the battery should not leak out as a result of an accident or other causes. They must be superior in terms of resistance against vibrations and shocks. They must also have a long service life even after repeated charge and discharge cycles. Various improvements have been made to satisfy these requirements and now a lead-sealed battery with excellent properties has been developed.

Moreover, each electric car incorporates a battery charging apparatus for charging batteries mounted thereon which can be recharged with a commercial A.C. power source when they are exhausted.

As a conventional battery charging apparatus designed for mounting on cars, a battery charging apparatus for a series battery consisting of battery chargers connected in series for batteries connected in series is known. For example, as shown in FIG. 6, the configuration of a battery charger C connected in series with the beginning terminal 2 and the ending terminal 3 of a column of batteries 1 consisting of 3 batteries B1, B2 and B3 is an example.

Such a battery charging apparatus for a series battery has a problem in that uneven characteristics of batteries connected in series inhibit good recharging.

For example, suppose that on an electric car a series of 12 batteries 12 V–25 Ah connected in series and a conventional battery charging apparatus for a series battery are mounted, they repeat cycles of charge and discharge until a drop in the voltage of the batteries no longer allows the car to run (for example, approximately 100 charge and discharge cycles). Suppose further that from among such batteries, a battery with a small balance of residual capacity (hereinafter referred to as battery B1), one with a medium balance of residual capacity (hereinafter referred to as battery B2) and one with a large balance of residual capacity (hereinafter referred to as battery B3) are chosen. Here, the battery with a large balance of residual capacity is a good battery whose characteristics as a battery have degenerated little, with a large capacity to discharge. The one with a small balance of residual capacity represents a battery of inferior performance whose characteristics as a battery have degenerated much, with a small capacity to discharge.

In order to compare the characteristics of these chosen batteries, the A.C. input terminals 4 and 5 of the battery charger C of the conventional battery charging apparatus are connected with the A.C. power source of 100 V, and the chosen batteries of different balances of residual capacity are connected in series to be recharged in series at a temperature of 20° C. FIG. 7 shows the relationship between electric current and voltage.

In FIG. 7 in which the current flowing in the charging circuit is represented by IO, the voltage of the battery B1 with a small balance of residual capacity is represented by E1, the voltage of the battery B2 with a medium balance of residual capacity is represented by E2 and the voltage of the battery B3 with a large balance of residual capacity is represented by E3. The charging current IO, after having remained firm at 9.75 A for the first one hour of charging, gradually decreased, and one hour and 10 minutes later at the point X the first gassing took place. During the Y interval from one hour and a half later until 3 hours later, continuous gassing occurred. In the Z interval from 3 hours and 20 minutes later, up to 40 minutes later the battery B1 discharged hydrogen gas.

The charging voltage E1 of the battery B1 with a small residual balance of capacity gradually increased, surpassed the optimum voltage of 14.5 V and reached 17 V about one hour later. Then, after maintaining this level, the voltage gradually declined. After the Z interval during which hydrogen gas was fully discharged, the voltage again rose. The charging voltage E2 of the battery B2 with a medium balance of residual capacity reached the optimum charging voltage about 3 hours and 20 minutes later, keeps on rising sharply and then stabilizes at a constant level. Thereafter, voltages E1 and E2 repeat voltage crossings. The charging voltage E3 of the battery B3 with a large balance of residual capacity remains at about 13 V and ends up with an insufficient charge.

When a conventional battery charging apparatus for a series battery is used for charging batteries, therefore, the battery B1 with a small balance of residual capacity and an inferior performance develops gassing which results in a rise in its internal pressure and discharges hydrogen gas resulting in damages to itself. The battery B3 with a large balance of residual capacity and a good performance, on he other hand, ends up with an insufficient charge. In other words, the use of a conventional battery charging apparatus for a series battery leads to a situation where batteries of inferior performance affect those of good performance and uneven characteristics of batteries connected in series inhibit any good charging.

In the manufacturing process, batteries of more or less even characteristics are normally produced in each case consisting of 6 cells. Their characteristics are, however, somewhat uneven among cases. In addition, the arrangement of batteries being charged results in different radiating conditions, and depending on their temperature, the optimum charging voltage is different for each battery.

Normally, in spite of such differences in optimum charging voltage depending on the characteristics and temperature of batteries, batteries are being charged at a same voltage. For this reason, a relatively small difference in internal resistance kept at first among batteries intensifies as charging in series is repeated. This difference in internal resistance shows up in the form of uneven characteristics of batteries, and gradually intensifies as discharges and charges are repeated.

If the charging voltage is not controlled according to the temperature of batteries, therefore, their service life is reduced. In particular when a quick charging of 5 to 10 hours is given, a heat runaway may damage the batteries in a short length of time.

Such uneven manufacturing and charging conditions produce gradual changes in the internal resistance and characteristics of batteries. According to the conventional serial charging method, the presence of a single battery with inferior performance results in insufficient charge in batteries of good performance. This condition cannot be changed by replacing a battery or batteries of inferior performance among the batteries connected in series and the presence of a battery of inferior performance among the batteries connected in series results in insufficient charging of batteries of good performance. In the actual situation, therefore, all the batteries connected in series including those having enough power are replaced.

In order to solve these problems, as shown in FIG. 8, the configuration of a plurality of batteries B1, B2 and B3 connected in series being connected in parallel with the same number of battery chargers C1, C2 and C3 to charge separately respective battery B1, B2 and B3 has been proposed in the past. The method of charging separately, however, requires two large cables 10 for each battery for wiring with batteries. For n number of batteries, 2×n cables are required. For this reason, the mounting of batteries in an electric car requires many large cables wired in a narrow space of the car and also much troublesome works.

OBJECTS AND SUMMARY OF THE INVENTION

The purpose of this invention is to provide a battery charging apparatus capable of charging separately at a voltage corresponding to the respective battery characteristics. Another purpose of this invention is to provide a battery charging apparatus capable of charging batteries in such a way that any battery may not be affected by others even when batteries of uneven performance are charged at the same time. Another purpose of this invention is to provide a battery charging apparatus capable of charging batteries without causing any drop in the charging characteristics due to the replacement of batteries whose performance has deteriorated. Another purpose of this invention is to provide a battery charging apparatus which facilitates wiring by reducing the number of output cables and by enabling the use of small cables in diameter.

This invention is summarized as follows:

A plurality of series-connected batteries are connected in series with the same number of battery chargers to constitute a column of battery chargers. And both output terminals of this column of battery chargers connected in series shall be the connecting terminals for connecting with the beginning and ending terminals of the column of batteries connected in series. And the junction point between the output terminal of a polarity of a battery charger and the output terminal of the other polarity of another battery charger connected in series with and adjacent to said battery charger serves as the connecting terminal to the junction point between the output terminal of a polarity of a battery corresponding to said battery charger and the output terminal of the other polarity of another battery connected in series with and adjacent to said battery.

Therefore, a column of battery chargers connected in series are connected in series to a column of batteries equally connected in series, and moreover the battery chargers and the corresponding batteries are connected in parallel. This configuration enables initial current to flow from the battery chargers to each of the batteries connected in series. And after a battery with the maximum balance of residual capacity is charged, a battery with the second largest balance of residual capacity is charged by the corresponding battery charger, and thereafter batteries are charged in the order to importance of residual capacity balance.

Each battery charger comprises a rectifier converting A.C. voltage into D.C. voltage, a charging voltage supply unit connected to this rectifier, a temperature detector detecting the temperature around or on the external surface of the battery to be charged and a control unit outputting voltage control signals corresponding to the temperature characteristic of the battery to the charging voltage supply unit in response to temperature detected by this temperature detector. This configuration enables to detect any rise in temperature due to heat generated by an increasing internal resistance within each battery by means of a temperature detector provided around or on the external surface of the battery, to output this detection signal to the control unit of the corresponding battery charger, which outputs a control signal to the charging voltage supply unit so that each battery may be charged at the optimum voltage corresponding to tis temperature characteristic.

A battery charger may also be provided with a voltmeter between its output terminals. This configuration enables to measure separately the voltage of each battery and facilitates the determination of the performance of the battery.

DETAILED DESCRIPTION OF THE PREFERRED EMBODIMENTS

Figure 1:
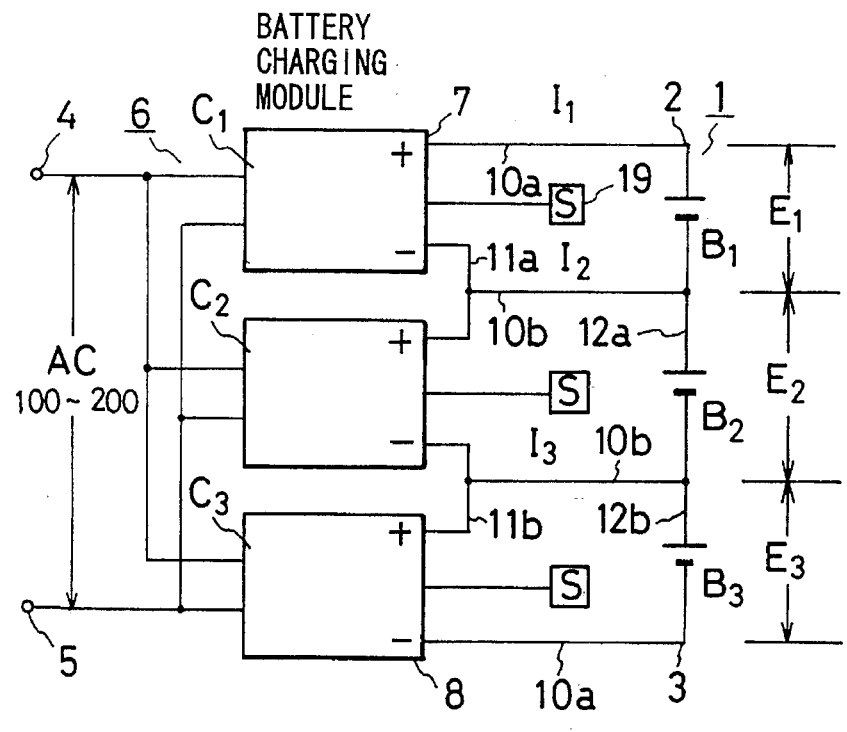
FIG. 1 is a circuit diagram of a battery charging apparatus for a series battery according to an embodiment of this invention.

The following is a detailed description of a preferred embodiment of this invention by referring to FIGS. 1–4. In FIG. 1, a plurality of batteries B1, B2 and B3 are connected in series to form a column of batteries 1. These batteries B1, B2 and B3 are connected in series with the same number of charging modules C1, C2 and C3 to form a column of charging modules 6. Each battery charging module is a battery charging means formed by combining itself with a corresponding battery. An output terminal 7 of this column of battery charging modules 6 is connected with the beginning terminal of said column of batteries 1 by a large output cable 10a, while other output terminal 8 is connected with the ending terminal 3 by a large output cable 10a, while other output terminal 8 is connected with the ending terminal 3 by a large output cable 10a, so that as a whole the column of batteries 1 is connected in series with the column of battery charging modules 6.

A connecting line 11a connecting the negative output terminal of the battery charging module C1 and the positive output terminal of the adjacent charging module C2 is connected with a connecting line 12a connecting the negative output terminal of the battery B1 and the positive output terminal of the adjacent battery B2 via a small output cable 10b. Likewise, a connecting line 10b connecting the negative output terminal of the battery charging module C2 and the positive output terminal of the adjacent battery charging unit C3 is connected with a connecting line 12b connecting the negative output terminal of the battery B2 and the positive output terminal of the adjacent battery B3 via a small output cable 10b.

Figure 3:
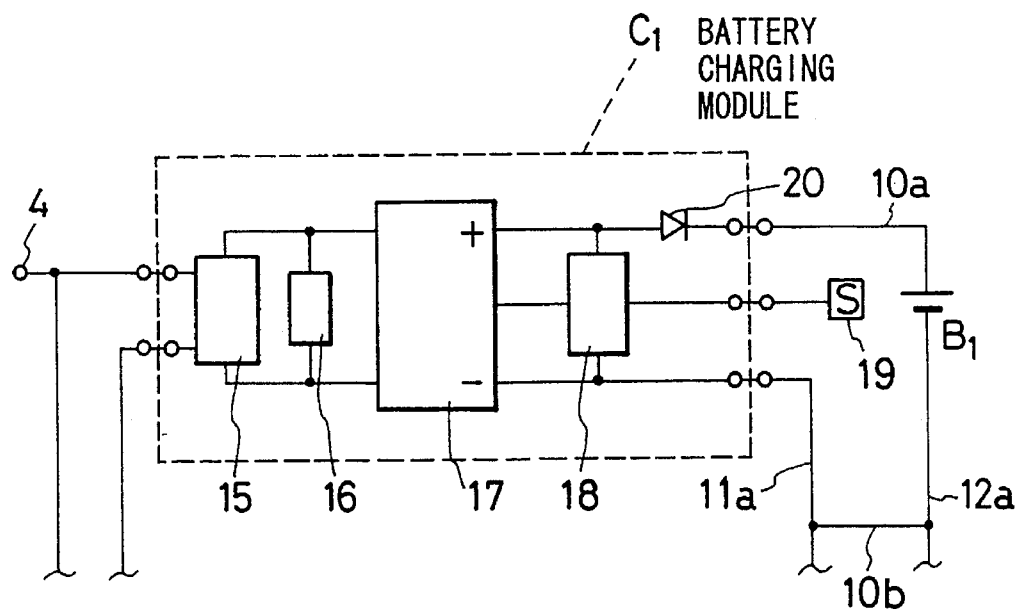
FIG. 3 is a circuit diagram showing a general configuration of a battery charger shown in FIG. 1.

A schematic diagram of said battery charging module C1 is shown in FIG. 3. The battery charging module C1 includes a rectifier 15 rectifying A.C. power and outputting D.C., a filter 16 eliminating ripples from D.C. current and converting its impedance into a low impedance, a charging voltage supply unit 17 converting D.C. voltage coming from this filter 16 into a different voltage value, a control unit 18 controlling the level of this charging voltage, a temperature detector 19 such as a temperature thermistor the output side of which is connected to this control unit and which detects temperature around and on the outside surface of the battery B1 and the positive terminal of the output side of the charging voltage supply unit 17. It is furthermore possible to provide a diode and other related devices between the positive terminal of the charging voltage supply unit and the positive terminal of the battery B1 to create an anti-reverse current means 20.

The same thing applies to the battery charging modules C2 and C3 connected with the batteries B2 and B3. The embodiment shown in FIG. 3 has 3 battery charging modules connected in series. However, the number of battery charging modules connected in series is not limited to 3 and can take any plural number corresponding to the number of batteries to be charged.

The following is a description of how the configuration mentioned above of battery charging apparatus for a series battery can be used to charge batteries connected in series B1, B2 and B3.

In this embodiment, as batteries to be charged, for example, a series of batteries consisting of 12 batteries 12 V–25 Ah connected in series are mounted on an electric car, and are charged and discharged repeatedly until the car no longer runs because of a drop in the voltage of batteries (for example about 100 charge and discharge cycles). From among these batteries, a battery with a small balance of residual capacity (hereinafter referred to as "battery B1"), a battery with a medium balance of residual capacity (hereinafter referred to as "battery B2") and a battery with a large balance of residual capacity (hereinafter referred to as "batteries B3") are chosen and connected in series. Here, a battery with a large balance of residual capacity means a battery of superior performance the characteristics of which have degenerated little and which still has a large capacity to discharge. A battery with a small balance of residual capacity, on the other hand, is a battery of inferior performance the characteristics of which have degraded much and which has a little capacity to discharge.

In the following description, due to convenience of description, the batteries B1, B2 and B3 as connected in series will be described in the order given.

Figure 2:
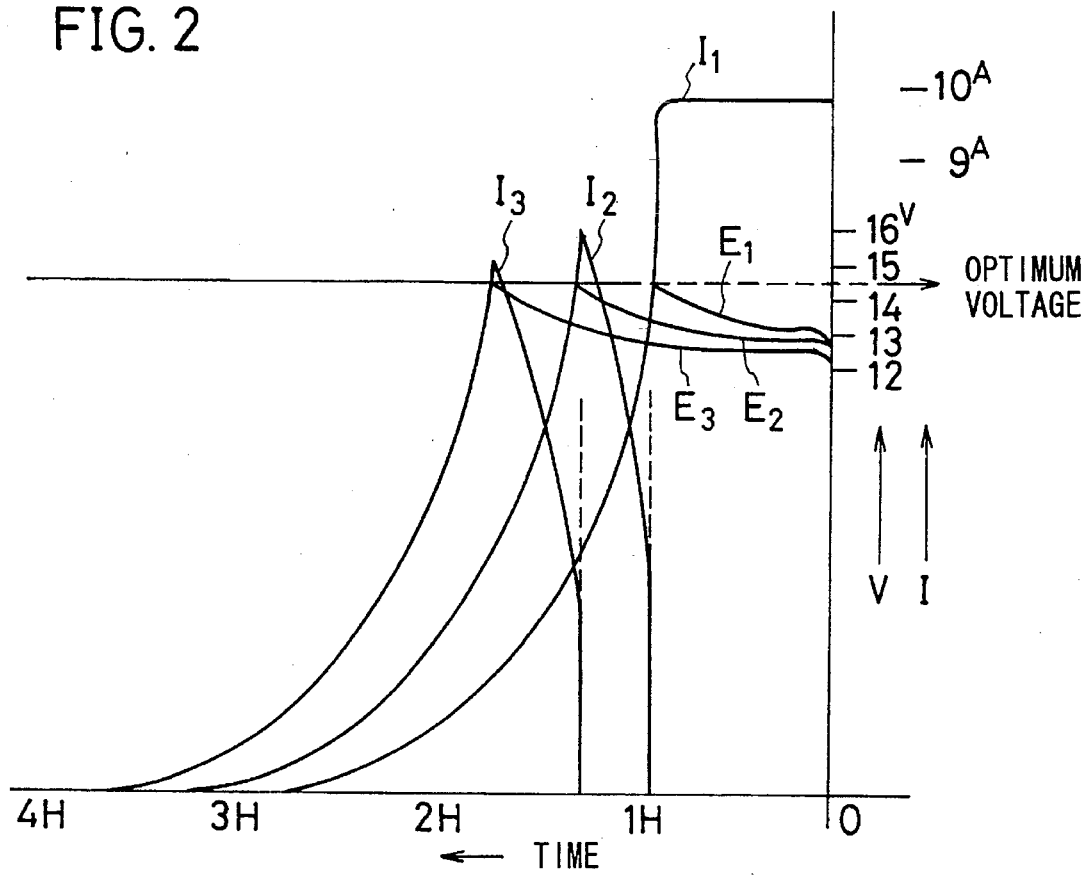
FIG. 2 is a graph showing changes in voltage and current during charging in a battery charging apparatus for a series battery shown in FIG. 1.

In the battery charging circuit based on the battery charging apparatus for a series battery as shown in this embodiment, as shown in FIG. 2, current I1 flows as initial current from the battery charging module C1 via a large output cable 10a to the batteries connected in series B1, B2 and B3 and charges he batteries at the same time. At first, the battery B1 with a small balance of residual capacity is charged fully. At this point in time, voltage E1 rises to the optimum voltage and current I1 begins to decrease.

As the charging process of a battery progresses, the concentration of dilute sulfuric acid within a separator increases thereby causing an increasing internal resistance of the battery itself and a decreasing intensity of current flowing within the battery. Therefore, as the battery B1 having been fully charged begins to show a higher internal resistance, after this battery B1 is fully charged, current I2 begins to flow from the battery charging module C2 via the small output cable 10b to the batteries B2 and B3. This current I2 gradually increases and continues to rise to reach the peak where voltage E2 is the optimum voltage for the battery B2 when the battery B2 is fully charged, and then begins to decrease. In other words, the battery B2 will be charged with a current corresponding to the sum of decreased current I1 and current I2.

Therefore, the value of the current I1 flowing in the large output cable 10a is the value of current supplied to all the batteries B1, B2 and B3, while the value of current I2 flowing in the small output cable 10b is the value of current supplied to the batteries B2 and B3, which is smaller than the said value of current of I1. For this reason, the output cable 10b through which this current I2 flows can be a small cable.

As the battery B2 fully charged begins to show a high internal resistance, after this battery is charged fully, current I3 begins to flow from the battery charging module C3 to the battery B3 via the small output cable 10b. This current I3 gradually increases and continues to rise to reach the peak where voltage E3 is the optimum voltage and then begins to decrease to end the charging process. In other words, battery B2 is charged with a current equivalent to the sum total of the decreased current I1, current I2 and current I3.

The output cable through which this current I3 flows can be a small cable because as mentioned above the value of current that flows is smaller than the value of current I1.

Figure 4:
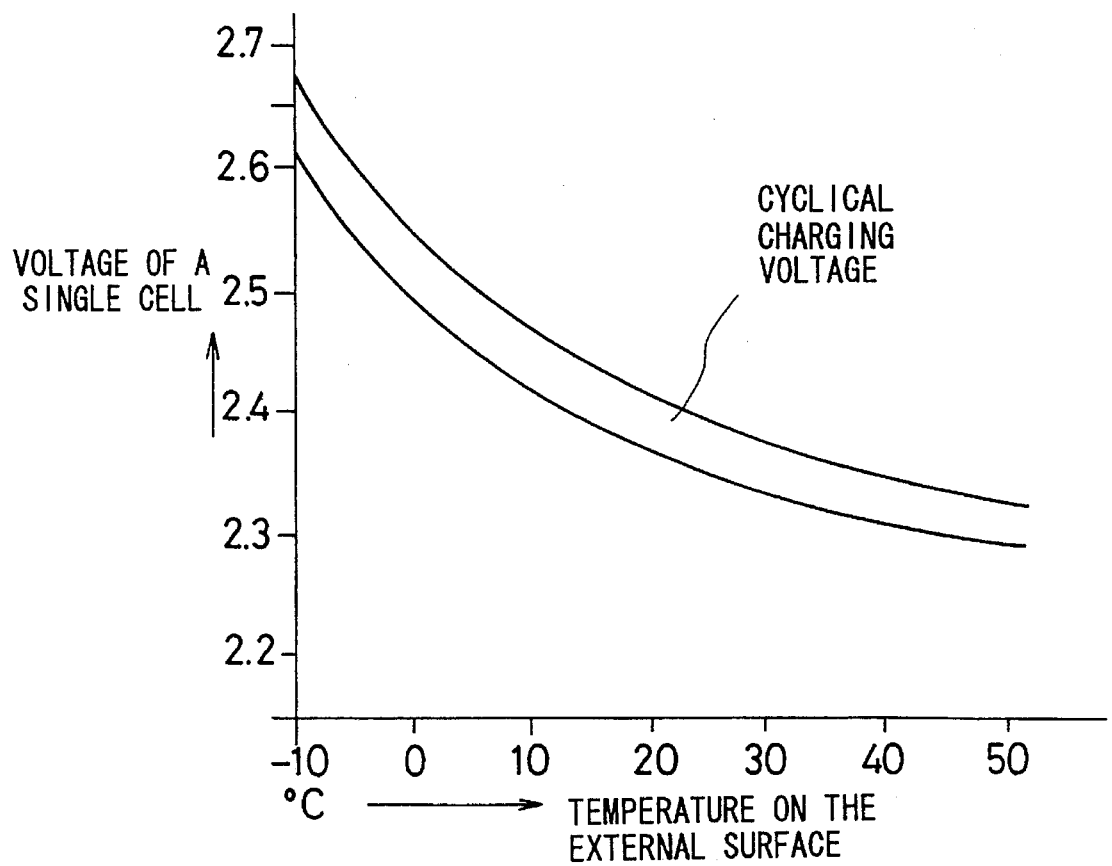
FIG. 4 is a graph showing the optimum charging voltage depending on changes in the temperature of the battery.

Lead-based batteries generally consist of a plurality of cells separated by separators. And the optimum charging voltage per single cell shows a temperature characteristic. FIG. 4 shows this temperature characteristic of the optimum charging voltage per single cell, and the curves in the figure represent the upper and lower limits of voltage impressed required to charge batteries, and the space between these upper and lower limits represents cycle charge voltage, voltage suitable for charging batteries. This temperature characteristic shows that the higher the temperature of batteries, the lower is the voltage suitable for charging them.

As mentioned above, when the internal resistance within a battery increases as the charging process progresses, the battery generates heat and its temperature rises. For this reason, depending on the charging condition, the optimum charging voltage suitable for battery charging changes. Each charging module of the battery charging apparatus of this invention, therefore, always monitors the temperature of battery by means of a temperature thermistor or other temperature detecting means 19 provided around or on the external surface of the battery to detect any rise thereof and any variations in temperature so detected sets in motion its control function so that the optimum charging voltage may be set. Detection signal outputted from the temperature detection means 19 is inputted into the control unit 18, which calculates the optimum charging voltage corresponding to the temperature detected in view of the temperature characteristic of the battery and outputs a voltage control signal to the voltage supply unit 17 so that this optimum charging voltage may be supplied to the battery. This temperature control is performed in every battery charging module so that the battery charging voltage may be controlled in response to any changes in the temperature of each battery. Thus, voltage applied to each battery will be maintained at the optimum level.

Figure 6:
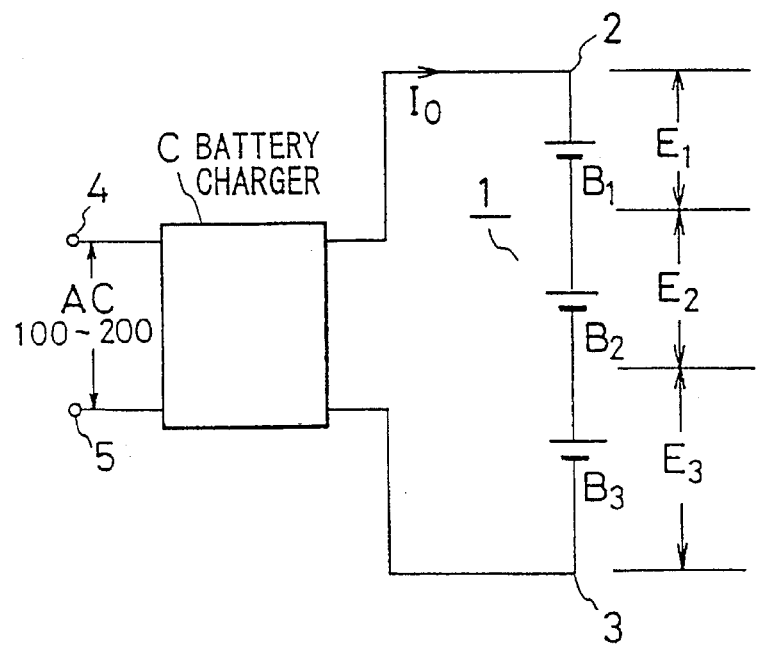
FIG. 6 is a circuit diagram showing a conventional battery charging apparatus for a series battery.
Figure 7:
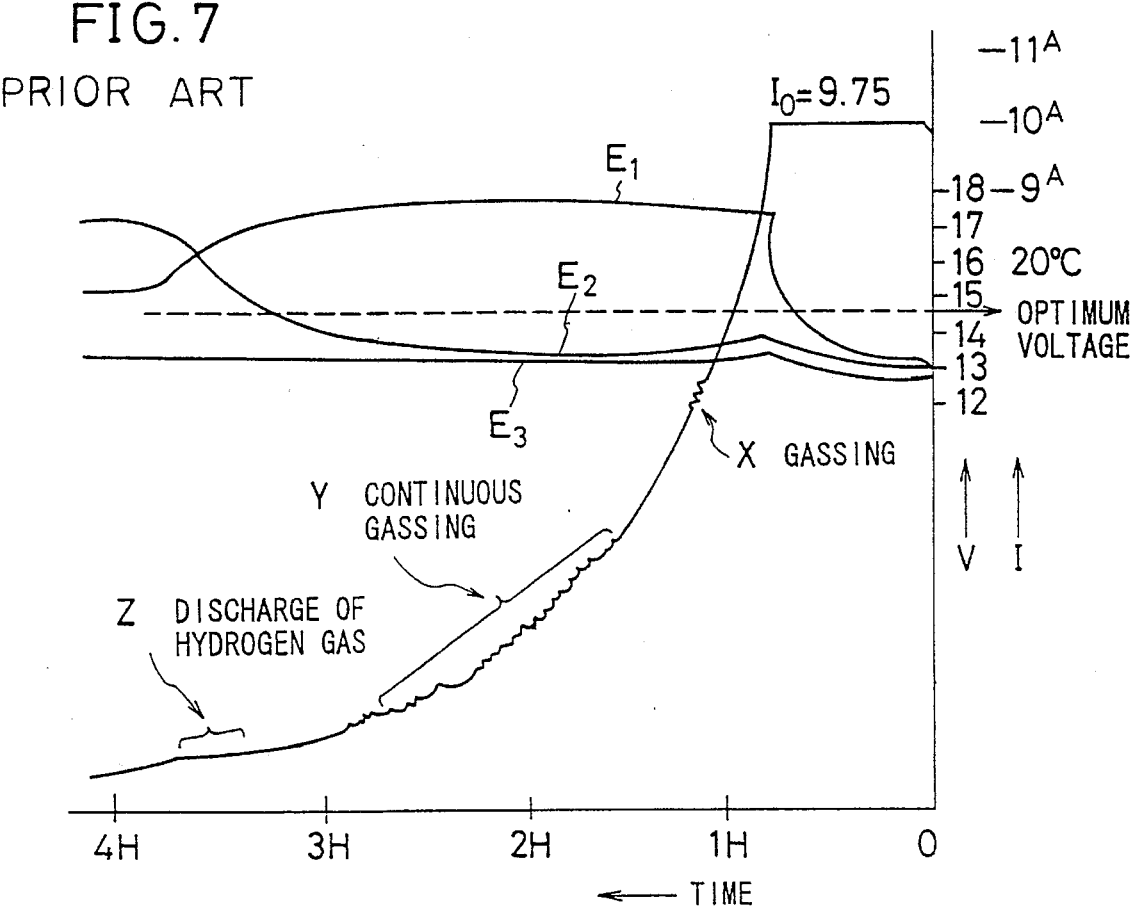
FIG. 7 is a graph showing changes in voltage and current during charging with a conventional series battery charging apparatus for a series battery.

The battery charging apparatus for a series battery as exemplified by the preferred embodiment of this invention, therefore, can charge batteries with the optimum conditions in response to the characteristics and temperature of individual batteries B1, B2 and B3 and can prevent adverse effects of conventional series battery circuit shown in FIG. 6 such as batteries of inferior performance causing insufficient charging of other batteries of good performance.

Figure 8:
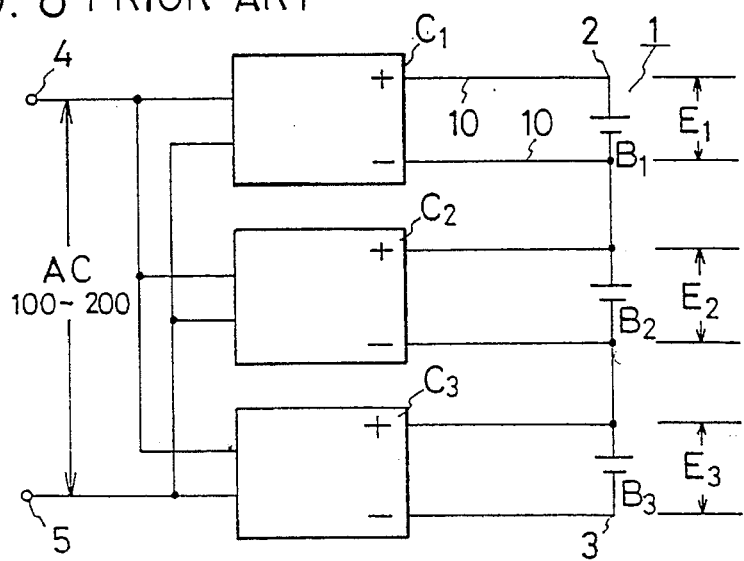
FIG. 8 is a circuit diagram showing a conventional parallel battery charging apparatus.

On top of this, in comparison with the conventional parallel charging circuit shown in FIG. 8, the number of 10 output cables is smaller by 2. When there were n batteries, 2n cables were required in the conventional method. This invention requires only n+1, reducing the space required for wiring of output cables in a narrow space available of a car and facilitating connecting operations.

Figure 5:
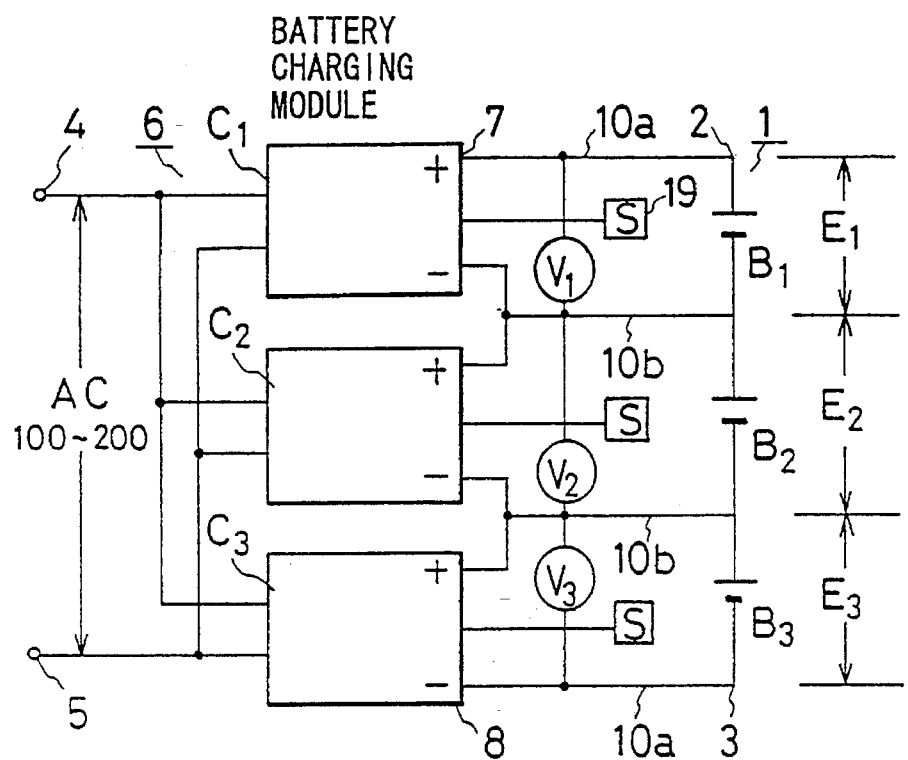
FIG. 5 is a circuit diagram showing another series battery charging apparatus for a series battery of this invention.

FIG. 5 shows another preferred embodiment of this invention. This embodiment consists of battery charging modules C1, C2 and C3, batteries B1, B2 and B3 corresponding thereto, output cables 10a and 10b connecting in parallel said battery charging modules and batteries and voltmeters V1, V2 and V3 connected in parallel among said output cables. According to this configuration, it is possible to measure separately voltages E1, E2 and E3 impressed on batteries being charged B1, B2 and B3. Therefore, the reading of each voltmeter V1, V2 and V3 at the initial state of battery charging enables to evaluate the performance of battery charging modules. For example, as shown in FIG. 2, the voltage E3 of the battery of good performance B3 is the lowest while the voltage E1 of the battery of poor performance B1 is the highest. This enables to choose batteries of poor performance. Moreover, as the battery charging apparatus for a series battery of this invention enables to charge individual batteries, the replacement of batteries with the highest voltage is made possible. Thus, it is no longer necessary to replace all the batteries as in the case of conventional battery charging apparatus for a series battery. And therefore a very high economy is achieved.

On top of this, in comparison with output cables connected in series, current flowing in output cables connected in parallel is reduced to about ⅒. Therefore, it is possible to reduce the cable diameter.

The above preferred embodiments describe the case of connecting 3 batteries in series, but the same thing can be said of n batteries being connected likewise. Furthermore, this invention can be applied not only for charging batteries mounted on cars but also for charging batteries mounted on robots and carriers and fixed batteries used as emergency power source.

As is evident from the above descriptions of the embodiments, the battery charging apparatus for a series battery of this invention can separately charge batteries depending on the performance of each battery. Therefore, even batteries of inferior performance can be charged to the fullest extent possible for each battery without producing any adverse effects on other batteries and thus can have a long service life. And in view of the fact that the replacement of only inferior batteries with reduced capacity is enough, the whole process is economic as compared with the replacement of all the batteries connected in series. Moreover, in comparison with the parallel charging circuit, the number of output cables can be reduced to the number of batteries + one cable and as for the dimension of the output cables connected in parallel, cables of small diameter can be chosen. Thus, space required for wiring can be reduced and connecting work is facilitated.

A battery charging apparatus provided with battery charging modules capable of detecting any changes in the temperature around or on the external surface of each battery to be charged and to control charging voltage supply units can charge each battery at the optimum conditions suitable for the temperature of each battery and therefore extend further the service life of each batter. The battery charging modules can automatically control voltage for 100% charging capacity only by detecting the temperature of corresponding batteries. Moreover, a battery charging circuit equipped with a voltmeter can measure separately the voltage of each battery being charged, facilitate the determination of the battery power and facilitates replacement work.

So that, the battery charging apparatus without other device such as CPU can be low cost with simple construction.

What is claimed is:

1. A battery charging apparatus for a column of batteries connected in series, comprising:

battery charging modules connected in series with the column of batteries and forming a column of battery charging modules, the number of said modules being the same as the number of batteries which form the column of batteries, adjacent series-connected battery charging modules being connected to one another via respective output terminals of different polarity, the terminals of different polarity joining at a respective junction point, the column of battery charging modules having two column output terminals, said column output terminals of said column of battery charging modules being respectively connected with a beginning and an ending terminal of the column of batteries, wherein the respective junction point between adjacent series-connected battery charging modules is connected to a junction between adjacent series-connected batteries, such that each battery has a corresponding respective battery charging module, and wherein each of said battery charging modules further includes:

a detector for detecting a charged state of a corresponding battery, a control unit for outputting a control signal which varies based upon the charged state of the corresponding battery detected by said detector, and a charging voltage supply unit connected to said control unit for charging the corresponding battery, each battery charging module supplying a continuously variable charging voltage from its charging voltage supply unit to the corresponding battery in accordance with the control signal.

2. The battery charging apparatus described in claim 1 wherein the detector of each of said battery charging modules is a temperature detector for detecting a temperature around an external surface of the corresponding battery, said control signal varying in accordance with the temperature detected by said temperature detector.

3. The battery charging apparatus described in claim 1, further comprising a voltmeter connected between the output terminals of each battery charging module for displaying the voltage across said output terminals.

4. The battery charging apparatus described in claim 2, further comprising a voltmeter connected between the output terminals of each battery charging module for displaying the voltage across said output terminals.

5. The battery charging apparatus described in claim 1, wherein the detector of each of said battery charging modules is a temperature detector for detecting a temperature on an external surface of the corresponding battery, said control signal varying in accordance with the temperature detected by said temperature detector.

6. The battery charging apparatus described in claim 5, further comprising a voltmeter connected between the output terminals of each battery charging module for displaying the voltage across said output terminals.

7. The battery charging apparatus described in claim 1, wherein adjacent series-connected batteries connect to the junction via respective output terminals of different polarity.

8. The battery charging apparatus described in claim 1, further comprising:

a pair of first cables connecting said column output terminals to the beginning and ending terminals of the column of batteries, respectively; and a smaller cable connecting a respective junction point between adjacent series-connected battery charging modules to a respective junction between adjacent series-connected batteries, said smaller cable being of smaller diameter relative to said first cable.

* * * * *

UNITED STATES PATENT AND TRADEMARK OFFICE
CERTIFICATE OF CORRECTION

PATENT NO. : 5,617,004
DATED : April 1, 1997
INVENTOR(S) : Akira KANEKO

It is certified that error appears in the above-identified patent and that said Letters Patent is hereby corrected as shown below:

On the title page, item [73] Assignee;

assignee information to be -- Integran, Inc., Tokyo, Japan, and Japan Tobacco Inc., Tokyo, Japan--

Signed and Sealed this

Twelfth Day of January, 1999

Attest:

*Attesting Officer*

*Acting Commissioner of Patents and Trademarks*